United States Patent
Bank

(10) Patent No.: US 9,608,441 B2
(45) Date of Patent: Mar. 28, 2017

(54) SINGLE-WIRE ELECTRIC TRANSMISSION LINE

(71) Applicant: Michael Bank, Jerusalem (IL)

(72) Inventor: Michael Bank, Jerusalem (IL)

(73) Assignee: SLE INTERNATIONAL LLC., Bay Harbor Island, FL (US)

( * ) Notice: Subject to any disclaimer, the term of this patent is extended or adjusted under 35 U.S.C. 154(b) by 78 days.

(21) Appl. No.: 14/172,517

(22) Filed: Feb. 4, 2014

(65) Prior Publication Data

US 2014/0152123 A1      Jun. 5, 2014

Related U.S. Application Data

(63) Continuation-in-part of application No. PCT/IL2012/000291, filed on Aug. 2, 2012.

(60) Provisional application No. 61/514,906, filed on Aug. 4, 2011.

(51) Int. Cl.
    *H02J 3/00* (2006.01)
    *H02J 3/44* (2006.01)
    *H02J 4/00* (2006.01)

(52) U.S. Cl.
    CPC ........ *H02J 3/00* (2013.01); *H02J 3/44* (2013.01); *H02J 4/00* (2013.01)

(58) Field of Classification Search
    CPC ........................................................ H02J 3/00
    USPC ........................................................ 307/149
    See application file for complete search history.

(56) References Cited

U.S. PATENT DOCUMENTS

| | | | |
|---|---|---|---|
| 593,138 A | 2/1897 | Tesla | |
| 2,685,068 A | 7/1954 | Goubau | |
| 4,242,685 A * | 12/1980 | Sanford | H01Q 13/18 343/700 MS |
| 6,104,107 A | 8/2000 | Avramenko | 307/149 |
| 9,246,405 B2 * | 1/2016 | Bank | H02J 3/44 |
| 2005/0258920 A1 | 11/2005 | Elmore | |
| 2007/0177679 A1 * | 8/2007 | Sovenyi | H04L 12/407 375/257 |
| 2008/0088403 A1 * | 4/2008 | Suzuki | H05B 41/2822 336/198 |

(Continued)

FOREIGN PATENT DOCUMENTS

RU         2273939         4/2006    ............ H02J 17/00

OTHER PUBLICATIONS

Michael Bank, "One-Wire Line System for Transmitting Energy or Information", Jan. 22, 2012, International Journal of Communications, Issue 2, vol. 6, pp. 55-63.*

(Continued)

*Primary Examiner* — Adi Amrany

(74) *Attorney, Agent, or Firm* — Henry M. Feiereisen LLC.

(57) ABSTRACT

A single-wire electric transmission line system that includes a power sources having first and second poles and a phase shifting device, coupled to one of the poles of the power source, in such a manner that the phase shifting device shifts the phase of a first signal propagating through the pole such that the shifted phase of the first signal will be essentially identical to the phase of a second signal propagating through the other pole. The shifted first signal is added to the second signal with essentially the same phase of second signal, whenever both poles are connected together to form a single-wire, through which the resulting added signal propagates.

7 Claims, 17 Drawing Sheets

(56) References Cited

U.S. PATENT DOCUMENTS

| | | | | |
|---|---|---|---|---|
| 2008/0109503 A1* | 5/2008 | Gross | .................... | G06F 1/0328 |
| | | | | 708/275 |
| 2009/0080804 A1* | 3/2009 | Hamada | ............... | H04N 5/2628 |
| | | | | 382/298 |
| 2009/0122932 A1* | 5/2009 | Hoshuyama | ....... | H03H 21/0012 |
| | | | | 375/350 |
| 2011/0039511 A1* | 2/2011 | Rajendran | ................ | H04B 1/18 |
| | | | | 455/326 |
| 2011/0181375 A1 | 7/2011 | Ma et al. | | |
| 2011/0254747 A1* | 10/2011 | Haridim | ................. | H01Q 1/243 |
| | | | | 343/722 |
| 2012/0169543 A1* | 7/2012 | Sharma | ............... | H01Q 9/0421 |
| | | | | 342/458 |
| 2013/0270898 A1* | 10/2013 | Bachmaier | ............ | H02M 7/493 |
| | | | | 307/9.1 |
| 2015/0002362 A1* | 1/2015 | Bank | .................... | H01Q 21/245 |
| | | | | 343/859 |

OTHER PUBLICATIONS

Elmore, G., "Introduction yo the Propagation Wave on a Single Conductor", Corridor Systems Inc. Jul. 27, 2009, pp. 1-30.

Pulse Electronics, "Understanding Common Mode Noise", Report G019.A. Apr. 1999.

Beaty,W. "Tesla's Big Mistake?", Sep. 1999. Published on Jul. 29, 2011 as per Wayback Machine.

"One-Wire Line System for Transmitting Energy or Information" in International Journal of Communication, Michael Bank, Feb. 22, 2012, pp. 55063.

\* cited by examiner (prior-art)

SINGLE-WIRE ELECTRIC TRANSMISSION LINE

CROSS-REFERENCE TO RELATED APPLICATIONS

This application is a Continuation-in-Part of International Application No. PCT/IL2012/000291 filed Aug. 2, 2012, designating the United States and claiming priority to U.S. Provisional Application No. 61/514,906, filed Aug. 4, 2011, the disclosures of both foregoing applications being incorporated herein by reference in their entireties.

FIELD OF THE INVENTION

The present invention relates to the field of electrical system. More particularly, the invention relates to an electrical transmission system which uses only a single-wire electric transmission line while eliminating the need to use the ground or another wire as commonly used as a second line.

BACKGROUND OF THE INVENTION

Usually in books, articles or lectures authors explain the work of an electrical circuit (A-Line) as the process of current flowing from the generator to the load by one wire, and then back to the generator by another wire. But it is known that free access electrons move relatively slowly, and the electrical energy is transmitted at light speed. Actually today's wires electric system uses two or more channels (wires) for transmitting energy or information. While in both channels there is the same information. It is known that active (real) power does not return from load to the generator. From this point of view may be does not need second channel in electrical system. In other words may be a line of electric system can be a single wire.

In the prior-art, there were attempts to perform electrical energy transmission by means of one wire. First applications of the single-wire electrical energy transmission were disclosed by Nikola Tesla in U.S. Pat. No. 1,119,736 and in British Patent No. 8,200. Another single line transmission technique is known as the Goubau line or G-line for short, which is a type of single wire transmission line which is used at UHF and microwave frequencies (see Geog Goubau, "Surface waves and their Application to Transmission Lines," Journal of Applied Physics, Volume 21, November, 1950). However, a G-line is a type of waveguide, rather than a wire in an electric circuit. There was experiment based on the Russian patent application 1993 year by Stanislav and Konstantin Avramenko [6-8]. All these proposals are based on signal processing like frequency up converting or signal straightening. These processing influences on transmitting information and lead to power lose.

There is also an electricity distribution method using only one conductor, but with the participation of earth. This method is known as the Single Wire Earth Return (SWER). However, the simplification of the energy transfer in this system is achieved due to the loss of half the power produced by the source.

It is well known advantages of three-phase system where energy transmitted by four wires. The presence of four wires is not the only drawback of three-phase system. Another drawback may be the fact that line voltage between two wires in this system at the root of the three above of phase voltage. This may have negative consequences, given such a corona effect and additional losses in the lines.

It is an object of the present invention to provide an electric system which is capable of using a single-wire channel for transmitting energy or information without signal form changing and additional loses.

It is another object of the present invention to provide an electrical system that does not use the ground instead of the second wire.

Other objects and advantages of the invention will become apparent as the description proceeds.

SUMMARY OF THE INVENTION

The present invention relates to a single-wire electric transmission line system, which comprises:
a) a power sources having first and second poles; and
b) a phase shifting device, coupled to one of the poles of said power source in such a manner that said phase shifting device shifts the phase of a first signal propagating through said pole by 180 degrees, such that the shifted phase of said first signal will be essentially identical to the phase of a second signal propagating through the other pole, and such that the shifted first signal is added to the second signal with essentially the same phase of second signal, whenever both poles are connected together to form a single-wire, through which the resulting added signal propagates.

The present invention further relates to a single-wire electric transmission line system, which comprises two phase shifting devices, coupled to each of the poles of the power source in such a manner that each of said phase shifting device shifts the phase of a first signal propagating through said pole and the phase of a second signal propagating through the other pole such that the shifted phases of both signals will be essentially identical, and such that the shifted signals are added with essentially the same phase, whenever both poles are connected together to form a single-wire, through which the resulting added signal propagates.

According to an embodiment of the invention, the phase shifting device(s) is an inverter that shifts the phase of its corresponding pole by +90 degrees, −90 degrees or by 180 degrees, such that the shifted signal(s) is added with essentially the same phase.

According to an embodiment of the invention, the phase shifting device is a transformer with opposite windings.

According to an embodiment of the invention, one of the two phase shifting devices is a Low Pass Filter (LPF) and the other phase shifting device is a High Pass Filter (HPF).

According to an embodiment of the invention, the phase shifting device is an essentially half period delay line with respect to the length of the line that is connected to the other pole of the source. For example, the delay line is one-port strip line including metal wire on dielectric, which lying on a metallic padding.

According to an embodiment of the invention, the phase shifting device(s) is a digital module adapted for performing phase shifting. For example, the digital module is a Hilbert transform device.

According to an embodiment of the invention, in the case of a DC signal, the phase shifting device runs as two capacitors connected in turn to charge through the keys to one of the outputs of a bipolar DC power supply, a second end connected to the power of the capacitor is grounded, the end of the capacitor disconnected from the source, who at the time of charging was grounded is connected to another output bipolar DC power supply and to the input of a single-line, the other end of the capacitor is grounded.

According to an embodiment of the invention, the single-wire is connected to a corresponding single-wire load module that includes a two polar load and phase shifting device coupled to one polar of said load, by splitting said single-wire into two lines, such that one line is coupled to said phase shifting device and the other line is coupled to the load, in such a manner that currents are flow in both lines, but in opposite phases with respect to one another.

According to an embodiment of the invention, the single-wire is split into three wires, wherein each of said three wires is connected to a different pole of a three phase load via a corresponding phase shifting device, in order to form a single-wire three phase system, in the following manner:
a) a first phase shifting device is coupled to one of the poles of said three phase load in such a manner that said first phase shifting device shifts the phase of a first signal propagating through said pole by −60 degrees;
b) a second phase shifting device is coupled to the second pole of said three phase load in such a manner that said second phase shifting device shifts the phase of a second signal propagating through said second pole by +60 degrees; and
c) a third phase shifting device is coupled to the third pole of said three phase load in such a manner that said third phase shifting device (which may be an inverter) shifts the phase of a third signal propagating through said second pole by 180 degrees.

According to an embodiment of the invention, the first phase shifting device of the three phase system is an inductance resistance and the second phase shifting device of said three phase system is a capacitor resistance.

In another aspect the invention relates to a single-wire load (instead of ordinary two wires load), which comprises:
a) a load having first and second poles; and
b) a phase shifting device coupled to one pole of said load, in such a manner in such a manner that said phase shifting device shifts the phase of a first signal propagating through said pole such that the shifted phase of said first signal will be essentially in opposite phase with respect to the phase of a second signal propagating through the other pole of said load, or:
c) two phase shifting devices, coupled to each of the poles of said load in such a manner that each of said phase shifting device shifts the phase of a first signal propagating through said pole and the phase of a second signal propagating through the other pole such that the shifted phases of said signals will be essentially in the opposite phases with respect to one another.

DETAILED DESCRIPTION OF THE INVENTION

Figure 1:
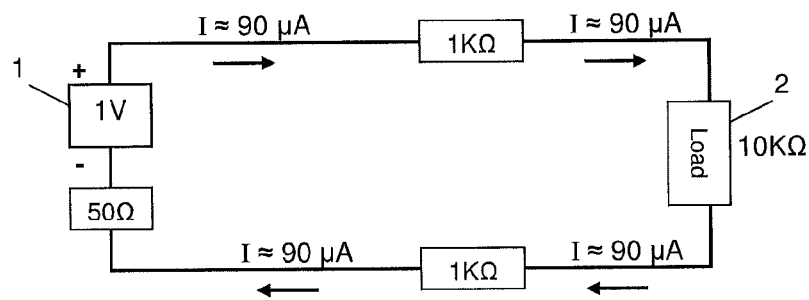
FIG. 1 schematically illustrates an example of conventional electric system (A-line), according to the prior-art.

Throughout this description the term "B-Line" is used to indicate an electrical circuit as the process of current flowing from the generator to the load by one wire. This term does not imply any particular arrangement or components, and invention is applicable to all suitable configurations of electrical circuits.

First concept—Today one can read another explanation as the process of current flowing. Not like from the generator to the load, and then back to the generator. But this explanation is following: "Two potentials derive from two terminal of source with opposite phases to two terminals of load with light speed". So energy flows in one direction.

Second concept—Using ground instead of one wire can be for very short distance only; because the earth resistance is much larger than the resistance of copper. According to the resistance of the earth can be from 5 to 5000 ohms per meter. In many electrical systems grounding is used to potential zeroing. An electrical ground system should have an appropriate current-carrying capability to serve as an adequate zero-voltage reference level. In electronic circuit theory, a "ground" is usually idealized as an infinite source or sink for charge, which can absorb an unlimited amount of current without changing its potential. The current flows into the ground and spreads out in an endless ground, as is the case with a protective earth. In the case of protective grounding, if an accident happens, the current anywhere in the other place does not get. The main characteristic of the grounding resistance is spreading current, i.e., a resistance that the earth (ground) has a current spreading at the site of this current. Land spreading is a ground area that surrounds the grounding electrodes, in which the boundary of the current density is so low that potential, which has virtually no land, depends on the current flowing from the electrodes. That is why outside of this boundary current can always be equated to zero. In other words, if one point of scheme connected to ground, it does not mean that the energy or the information is transmitted to another point scheme, which is also connected to ground. Both points have potential equal zero.

Third concept—If one would like to get adequate electrical energy transmitting system processing, one need to do that source and load can "see" the same resistances. And load current mast is the same that is match to Ohm low.

Reference will now be made to several embodiments of the present invention(s), examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The terms, "for example", "e.g.", "optionally", as used herein, are intended to be used to introduce non-limiting examples. While certain references are made to certain example system components or services, other components and services can be used as well and/or the example components can be combined into fewer components and/or divided into further components.

Figure 2:
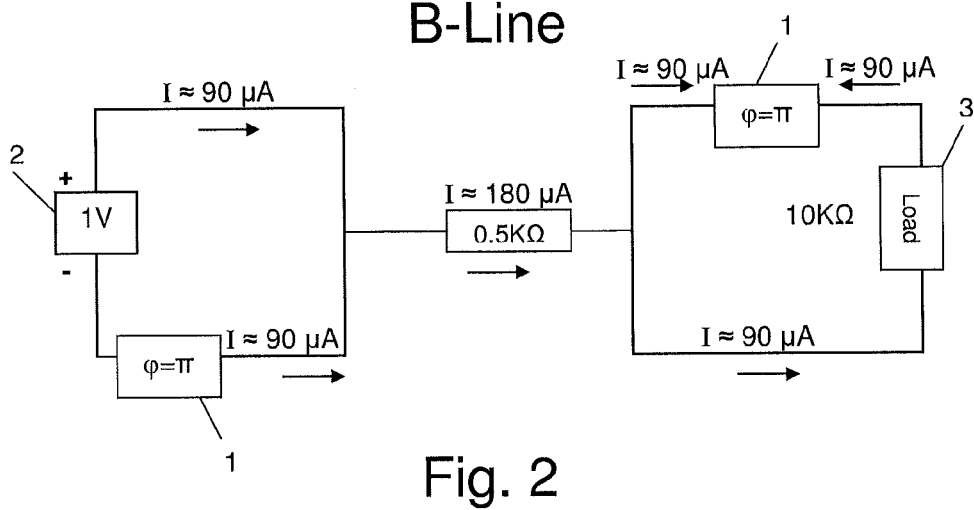
FIG. 2 schematically illustrates a single-wire electric system (B-Line) that is equivalent to the A-line system of FIG. 1, according to an embodiment of the present invention.

It will be better to explain the main idea of a single-wire electric system of the present invention (i.e., B-Line) by comparison with a conventional electric system (i.e., A-Line). FIGS. 1 and 2 schematically illustrate an A-Line circuit and a B-Line circuit, respectively. Both circuits include a common power source 2 (e.g., 1 volt generator), a load 3 (e.g., R=10 KOhm) and the currents is about 90 microamperes (I≈90 μA). At the A-Line circuit the lines resistance is about 1 KOhm, and at the B-Line circuit, the resistance of the single-wire transmission line is about 0.5 KOhm as will be described in further details hereinafter. The equivalent B-Line circuit includes a first phase shifter 1 coupled to one poles of the power source 2 and a second phase shifter coupled to one of the poles of the load 3.

The B-Line system of the present invention is based on the assumption that it would be possible to combine two wires (i.e., the electric lines running out from the first pole and the second pole of a power source) if currents would be of the same amplitudes and same phases. For example, this can be achieved by inserting a phase shifting device (i.e., the phase shifter 1) in one of the lines. The phase shifting device shifts the phase of a first signal propagating through that line such that the shifted phase of the first signal will be essentially identical to the phase of a second signal propagating through the other line. For instance, 10 milliseconds delay line can be used for signal with a frequency of 50 Hz. After the phase shifting device, phases and amplitudes of the currents in both lines are essentially identical. Thus, at the generator side (i.e., at the power source 2 side), both lines can be combined into a single wire, such that the shifted first signal is added to the second signal with essentially the same phase of the second signal, whenever both lines are connected together to form a single-wire, through which the resulting added signal propagates (i.e., the sum of the currents from both lines).

At the load side, the single wire splits into two wires (i.e., two lines), and similarly to the generator side, a phase shifting device (i.e., a second phase shifter 1) can be inserted before the load 3 in one of the split wires in order to ensure a normal functionality of the load 3. As a result, the two conventional wire system (FIG. 1) turns into one-way B-Line system (FIG. 2), but the power source 2 and the load 3 will "see" the conventional two wires system (i.e., A-Line).

According to an embodiment of the invention, the needed phase shift can be achieved by means of a phase shifting device in form of a delay line, a transformer with opposite windings, low pass and high pass filters, digital phase shifters such as Hilbert transform device(s), etc. For example, if a delay line is used as a phase shifting device, then its delay must correspond to half period. In the case of 50 or 60 Hz frequencies it is practically impossible using delay line, recall that wire, which corresponds to half wave length, has length equals 3000 or 2500 km. It is convenient on low frequencies to use transformer with opposite windings as phase shifter. As for high frequencies the good solution is delay line.

The main idea of the single-wire electric transmission line of the present invention was supported on ADS and CST simulations programs. Series of simulations with different phase shifters and various resistance lines were carried out. Each simulation was carried out for the A-Line and the B-Line. For clarity, FIGS. 1-3 show the conditions and the simulation results including polarity and magnitude of currents.

That's one of the simulations for the verification of Ohm's law in the proposed scheme (see FIG. 1). In this typical A-Line circuit, current amplitude everywhere should be 90 μA, wherein 0.5 kOhm is the lines resistance.

In the proposed B-Line scheme (see FIG. 2), we added phase two shifting devices the first at the input and the second at the output, and combined the two lines. As a result a line resistance is 0.5 kOhm. The simulation shows that the currents at the input and output have not changed. The polarity of the load current depends on where the phase shifting devices are at the top or bottom.

Figure 3:
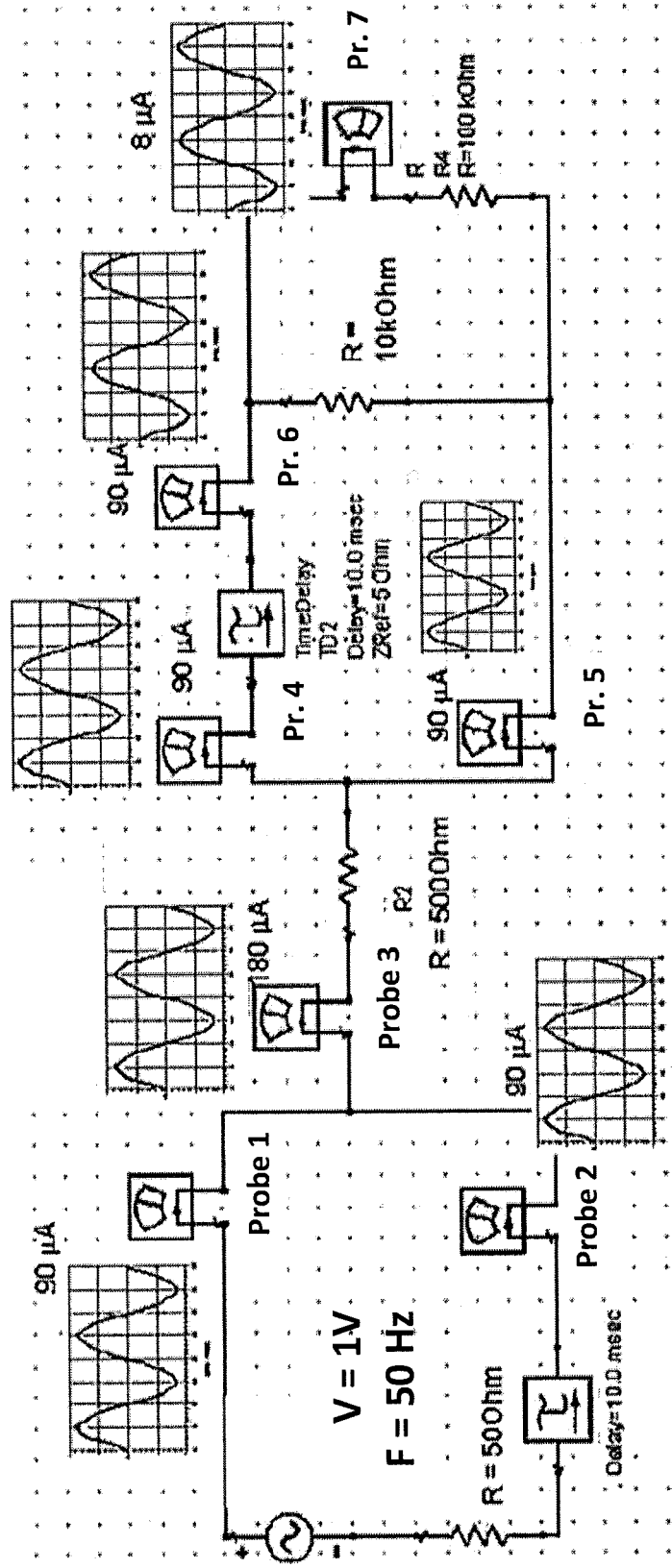
FIG. 3 is a print out of the simulation results of the B-Line system of FIG. 2.

One can see on FIG. 3 the simulation results of the B-Line system of FIG. 2. For example, in case the phase shifting device is a transformer with opposite windings, then reverse one wire current phase by the transformer can be reset the current flowing from the winding only. Simply connect the windings cannot be, otherwise the current from one winding to another will flow and the transformer will not perform its functions. As in other similar cases, zeroing can be done with earth (see "Circuit Grounds and Grounding Practices", George Hunka, Undergraduate Laboratory, Dept. of EE, University of Pennsylvania). As will be shown in the following section, the land is not involved in the transfer of energy from the source to the load.

Figure 4:
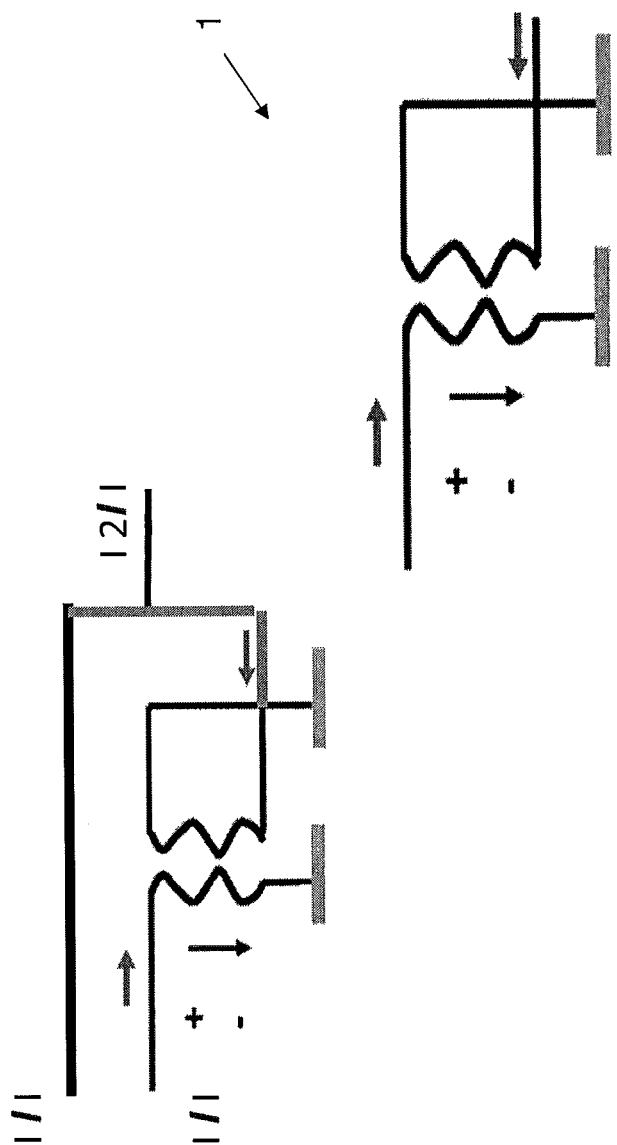
FIG. 4 schematically illustrates a phase shifting device in form of a transformer, according to an embodiment of the present invention.

FIG. 4 schematically illustrates a phase shifting device that can be used in conjunction with the invention. In this embodiment, the phase shifting device is in form of a transformer. The phase shifting device illustrated in this figure is particularly convenient because it can be easily applied to low frequency systems. The phase shifting device is generally indicated by numeral 1 in the figures.

Figure 5:
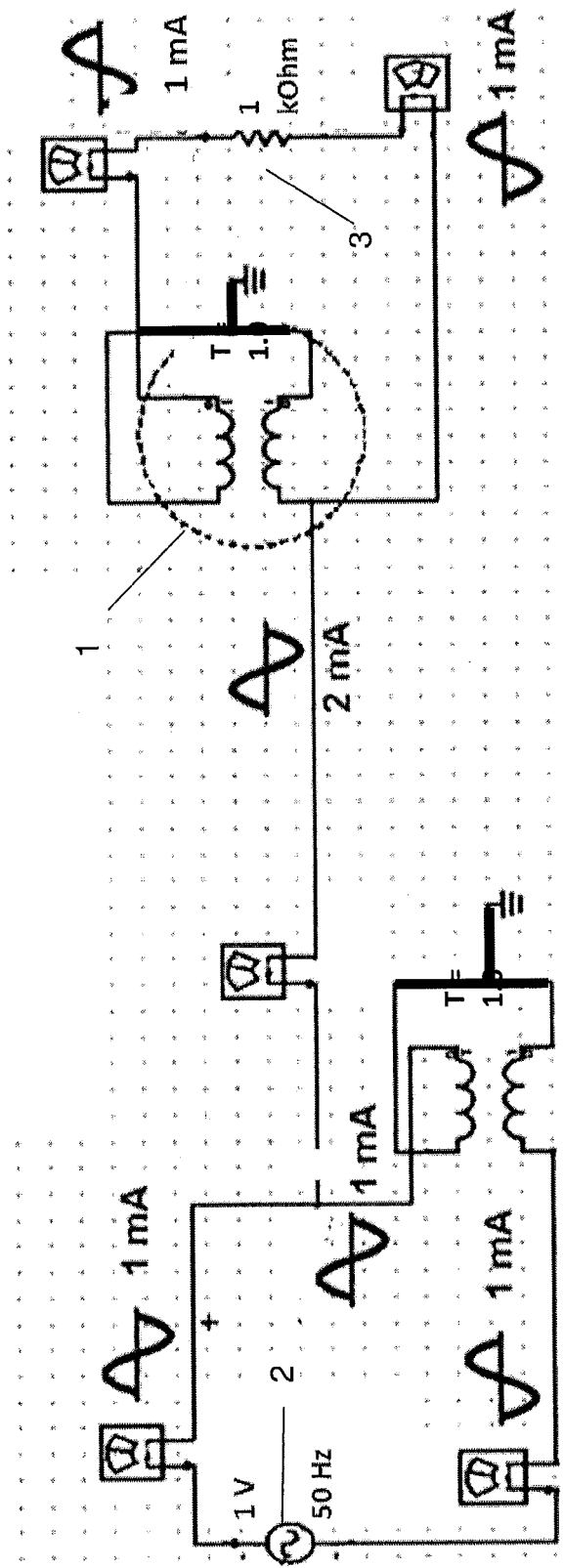
FIG. 5 is a print out of the simulation result of a B-Line system with the transformer of FIG. 4.

FIG. 5 is print out that shows the results of a B-Line circuit simulation with two units of inverter 1 (as indicated by the transformers TF1 and TF2). The first transformer TF2 is coupled to an AC voltage source SRC 1 (as indicated by numeral 2) and the second transformer TF1 is coupled to the load 3 (as indicated by the resistor RI). One can see on FIG. 5 B-Line circuit with ideal 1:1 transformers simulation.

If the B-Line is used in a system with raising or lowering the voltage, the inverter 1 must be used in both lines. In the one line is used as the transformer with the same included windings (as indicated by transformer TF2) and in the second line with opposite included windings (as indicated by transformer TF1). The grounding in FIG. 5 is zeroing and therefore it is not used and cannot be used as the return path (i.e., the second line). There are several evidences that the earth is not involved in the transfer of power, although one of any evidence would be enough. The main evidence is that the current in B-Line equals to double current in normal scheme and corresponds to Ohm low. So it is impossible any additional current.

Obviously, in the case of a normal two-wire circuit where the source gives 1 V and a load resistance is 50 ohms the current will be equal to 20 mA. For example, in the case of the B-Line circuit like in FIG. 5 the current in wire should be 40 mA.

Figure 6:
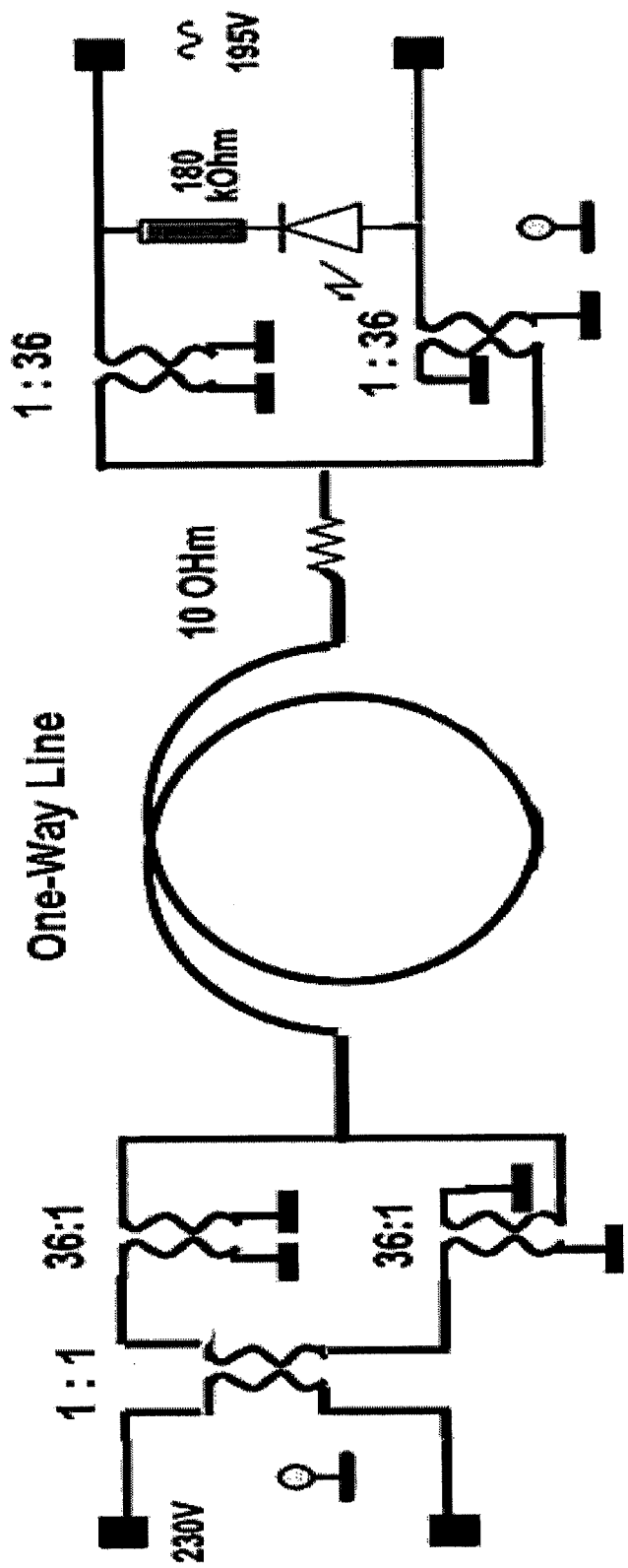
FIG. 6 schematically illustrates a scheme of B-Line model with dividing transformers.

With the aim of experimental verification of the proposed solutions were prepared a number of models. Details of the layout mounted on a wooden board, as a zeroing-grounding used electrical network protective grounding. All voltages and currents in the model coincided with the results of the simulation. To eliminate possible doubts about the possible involvement of the land in signal transduction through the neutral wire three-phase system was tested model with dividing (isolating) transformer at the input. This model scheme is shown in FIG. 6. The model shown in FIG. 6 continued to operate normally and when it was taken out of the receiving part of the laboratory at a distance of about 80 meter and used as a grounding metal rod.

B-Line on High Frequency

Let us show that B-line idea is correct for the high frequency too. On frequency 50 Hz simulations where made by ADS program. This program allows simulating different elements but not electrical lines. So for electrical lines simulations was used element like delay line. On height frequencies one can implement CST program. This program allows simulating different elements including electrical lines.

Figure 7:
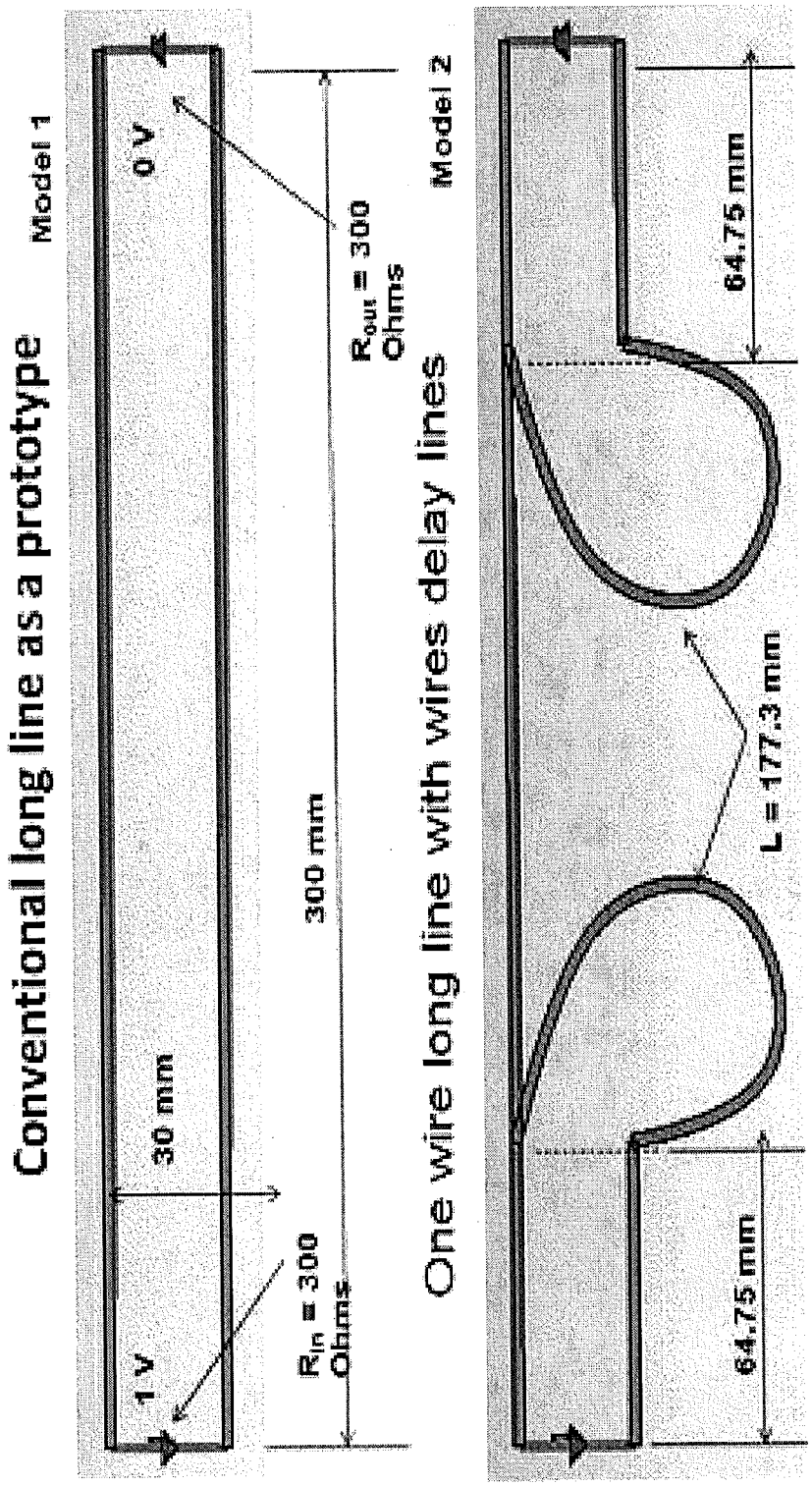
FIG. 7 schematically illustrates a conventional high frequency long line and its B-Line equivalent implementation.
Figure 8:
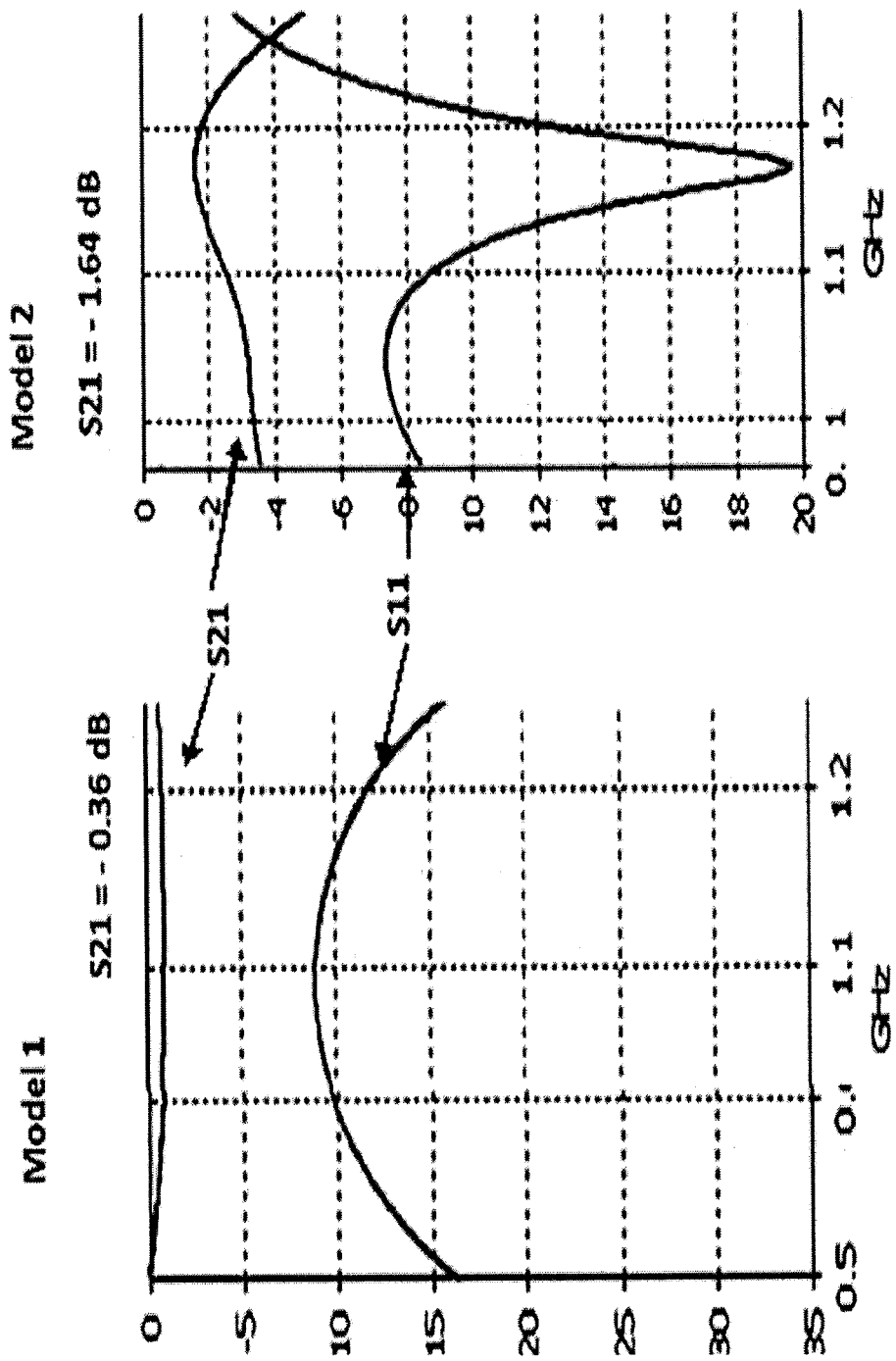
FIG. 8 the simulation results of the long line and its B-Line equivalent of FIG. 7.

First we compare normal long line with characteristic impedance 300 Ohm with B-Line on frequency 1.1 GHz. Both models are shown in FIG. 7, wherein FIG. 8 shows the simulation results of models 1 and 2 of FIG. 7, on frequency of 1 GHz (as indicated by parameters S11 and S21). On 1.1 GHz it was possible to make delay lines by lines with long equals half wave long. Parameter S21 is the same practically. Parameter S11 of model 2 is better than S11 of model 1. One can see on FIG. 8 on 1.1 GHz S11 of B-Line is −20 dB and of normal long line is −10 dB. This means that in case of B-line all energy goes from source to load (i.e., there is no power loss).

Figure 9:
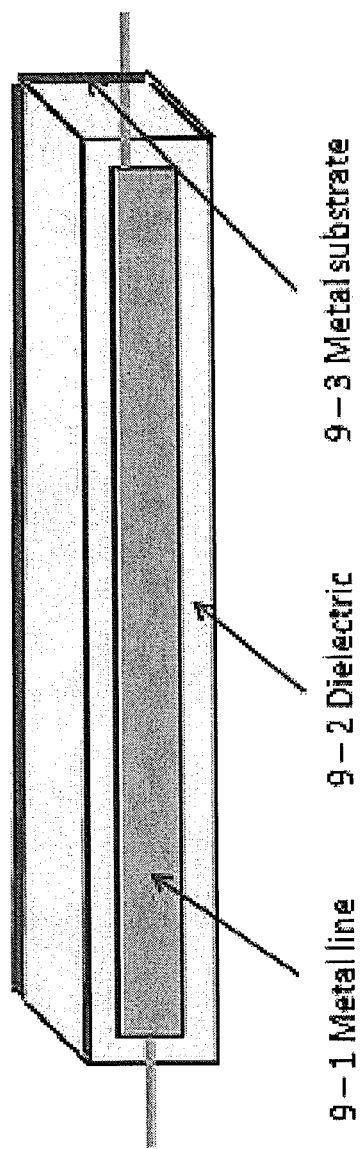
FIG. 9 schematically illustrates an exemplary one-port strip line for frequency of 2.3 GHz.
Figure 10:
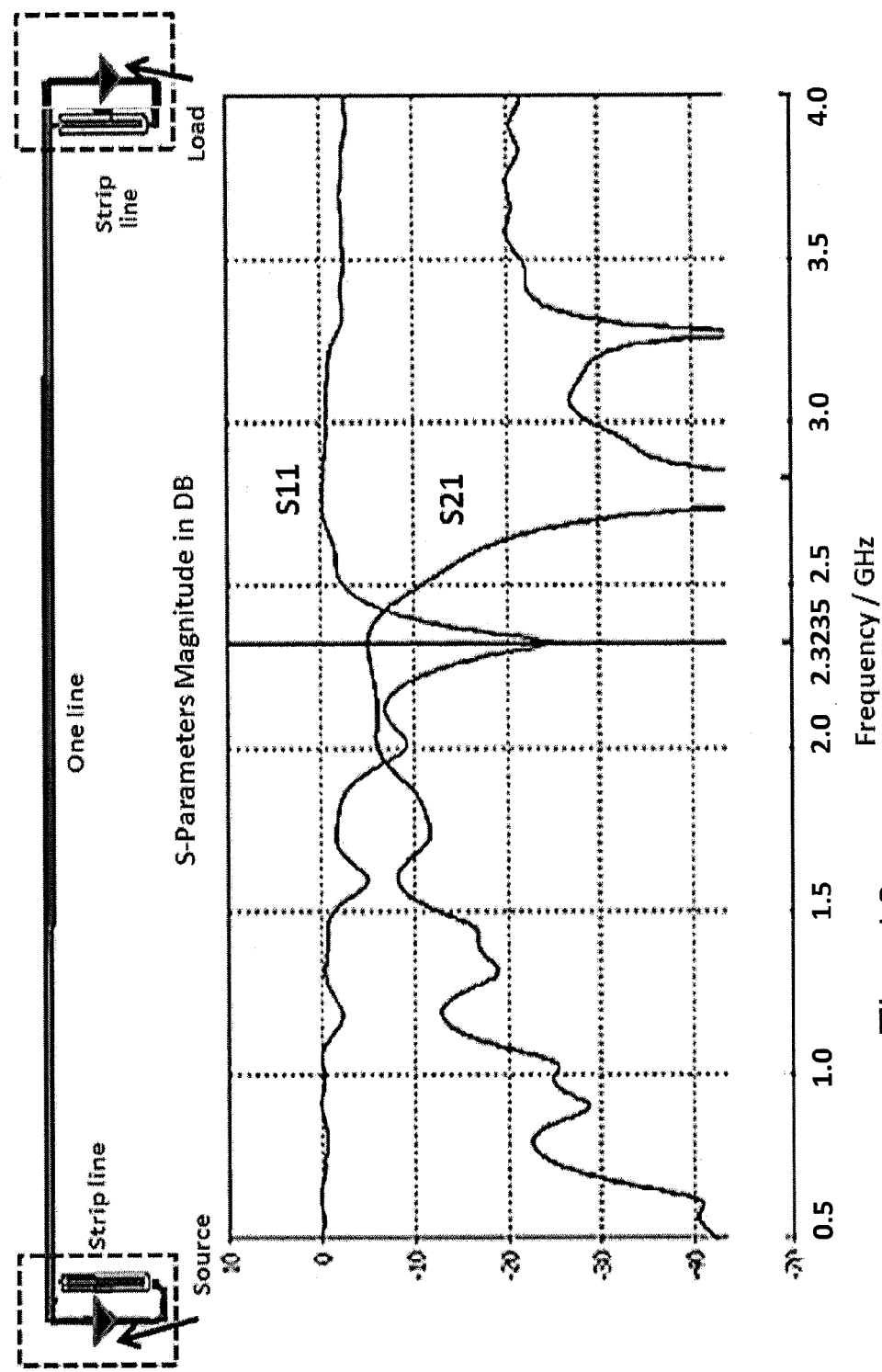
FIG. 10 is a graph showing the B-Line with the one-port strip line for frequency 2.3 GHz of FIG. 9 and its simulations results.

In high frequency it is possible to make delay line like one-port strip line, e.g., as shown with respect to FIG. 9. With this strip line was made simulation of one wire long line. The simulation results in terms of S-parameter (S1 and S2) magnitude (in dB) are shown in the graph of FIG. 10. The matching long the line is infinitely wide band passes (see appendix about eternal resonance system). This is an advantage, but also disadvantages. There is an advantage because you can pass on a long line of multiple signals with different frequencies. However, in a real system there is always some noise. Even if noise is weak, but in an infinitely wide band it will be infinitely large noise (of course, if the noise is white). Of course, you can apply a filter at the input of the receiver. But this is often problematic. The filter introduces loss and increases the noise factor.

The proposed single-wire system (B-Line) is a selective system. The disadvantage of B-Line is a need to change the delay line in case of change of frequency. B-Line is compatible with the source and load, and in this sense no different from the usual long line. It is selective, but rather broadband. It has no requirements of symmetry, which is often a problem in the prior-art systems when using long line inside the apparatus, where can be different influences on each wire.

DC B-Line

Figure 11:
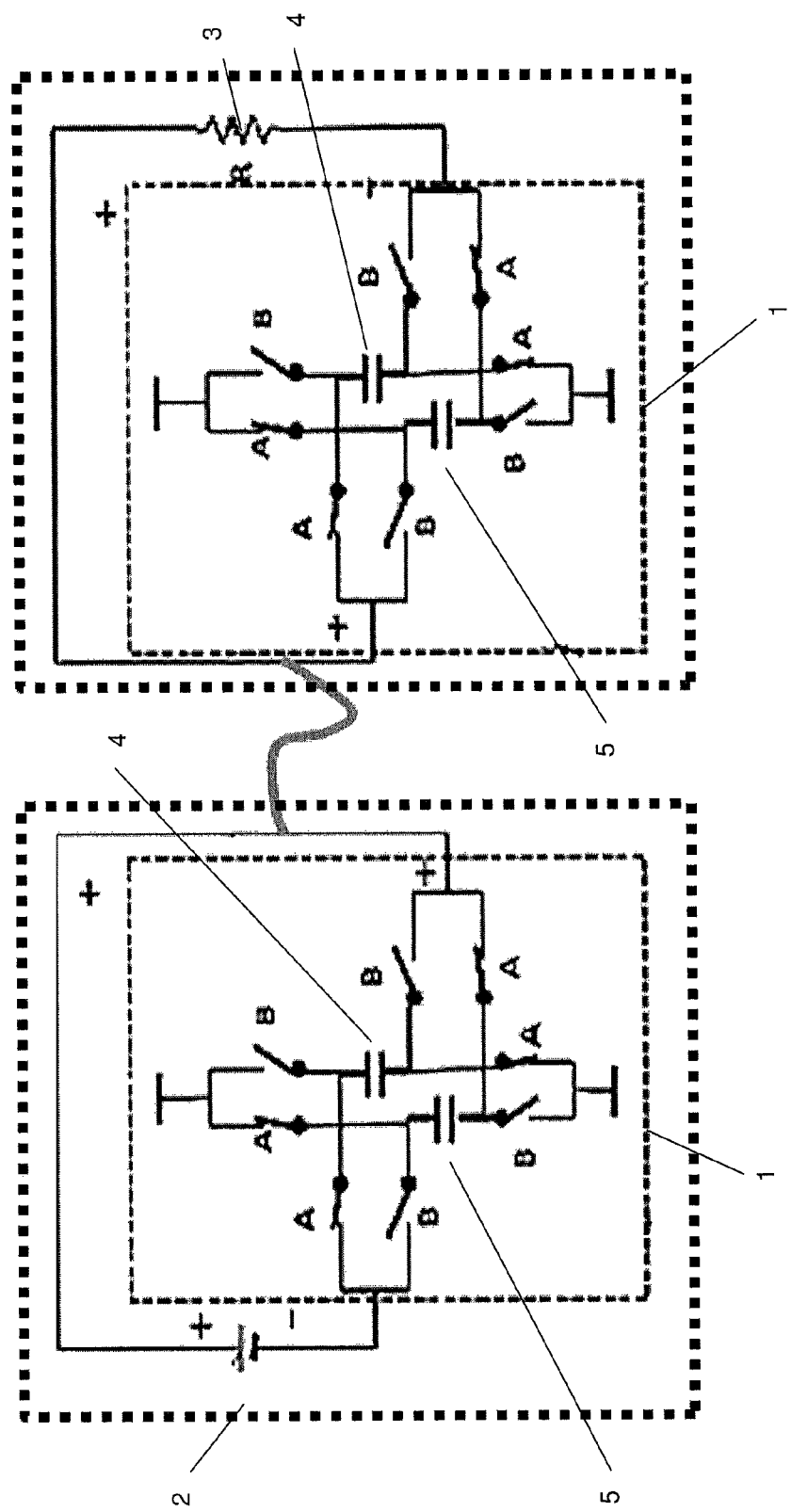
FIG. 11 schematically illustrates an exemplary implementation of a DC B-Line circuit, according to an embodiment of the present invention.

To implement the inverter 1 in a DC circuitry it requires a different solution then the aforementioned transformers. According to an embodiment of the invention, it is proposed to use two capacitors and corresponding switches to implement the inverter 1 (as shown with respect to FIG. 11 in the source side 2 and correspondingly at the load side 3). Each of the inverter 1 operates as follows: In one period the first capacitor is charges and the second is discharged. In second period they switch functions. Charging current is in one direction, but discharging current direction is reversed.

In this embodiment, in line current has one direction, positive or negative. In this figure, the direction is positive. The resistance value is usually set. So first and second period's duration can only be choosing by value of the capacitors. For example, such a DC B-Line system can be implemented in an electrical railway system (i.e., tramway). In this case, it is possible to transmit electrical power only in wire or only in the rails.

One-Pole Source

Figure 12:
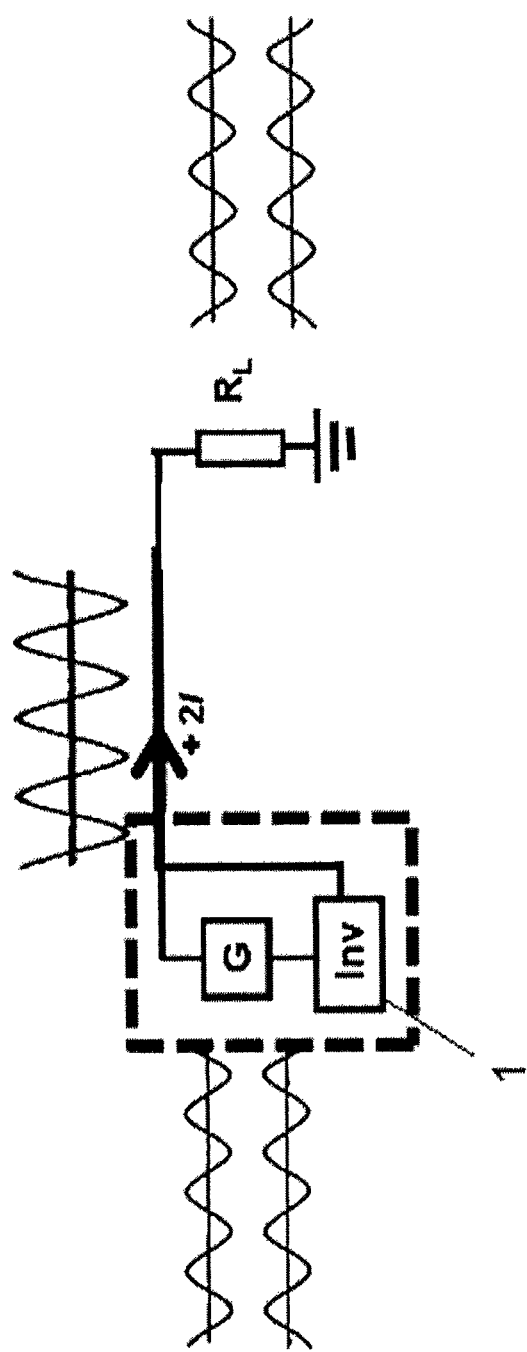
FIG. 12 schematically illustrates using one-pole source principle, according to an embodiment of the present invention.

The idea of B-Line system allows defining another new element of an electrical circuit—one-pole generator (i.e., source). If we will allocate the connection of the generator and the converter in B-Line scheme, we can talk about unipolar source (as indicated by dotted line in FIG. 12) where one load terminal is connected to a single-wire, and the second load terminal is grounded (connected to zero voltage). In this case there is no loss of energy, as all the current coming from a single line passes through the load.

B-Line Three Phase Systems

Figure 13:
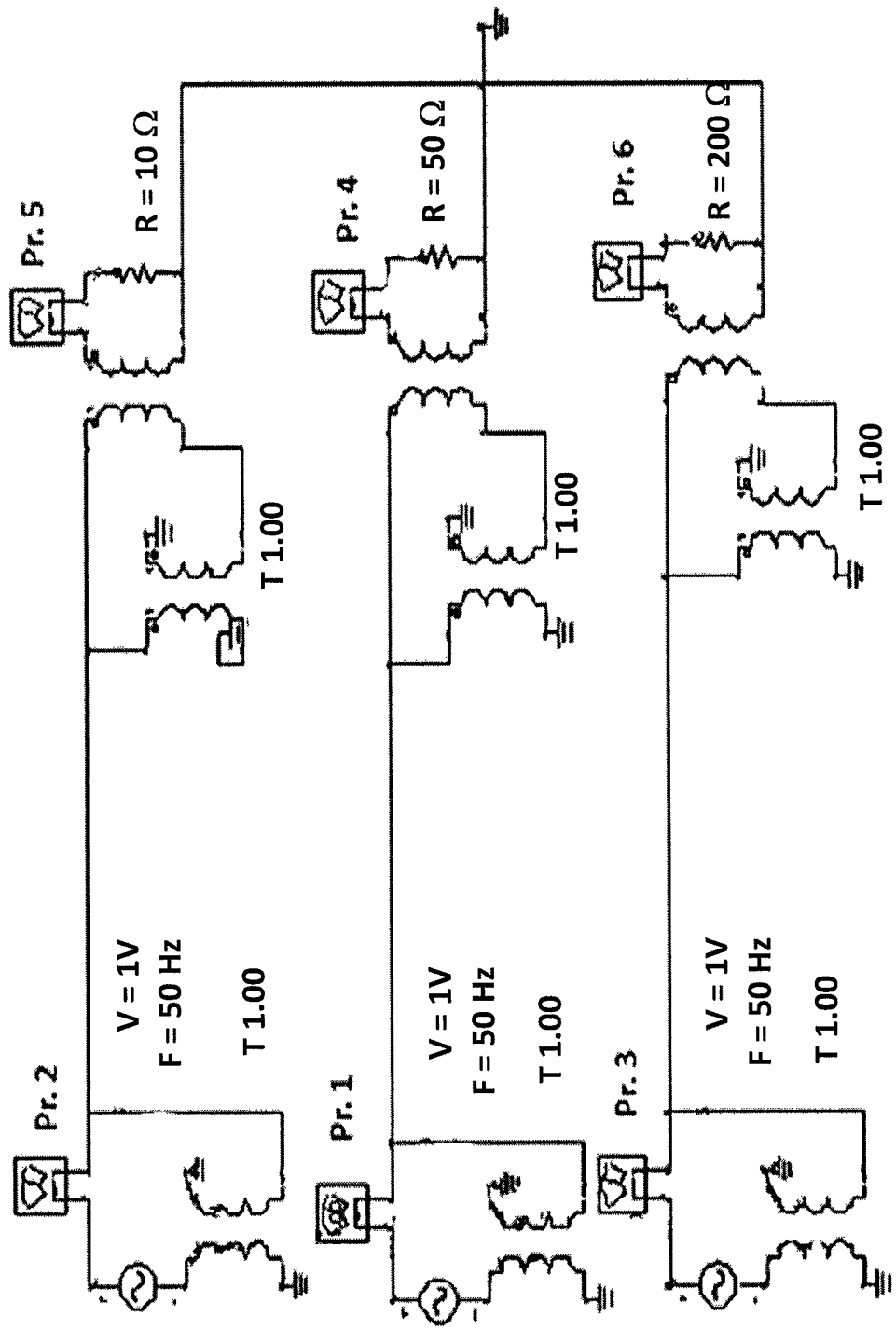
FIG. 13 schematically illustrates an exemplary implementation of a B-Line three phase scheme, according to an embodiment of the present invention.
Figure 14:
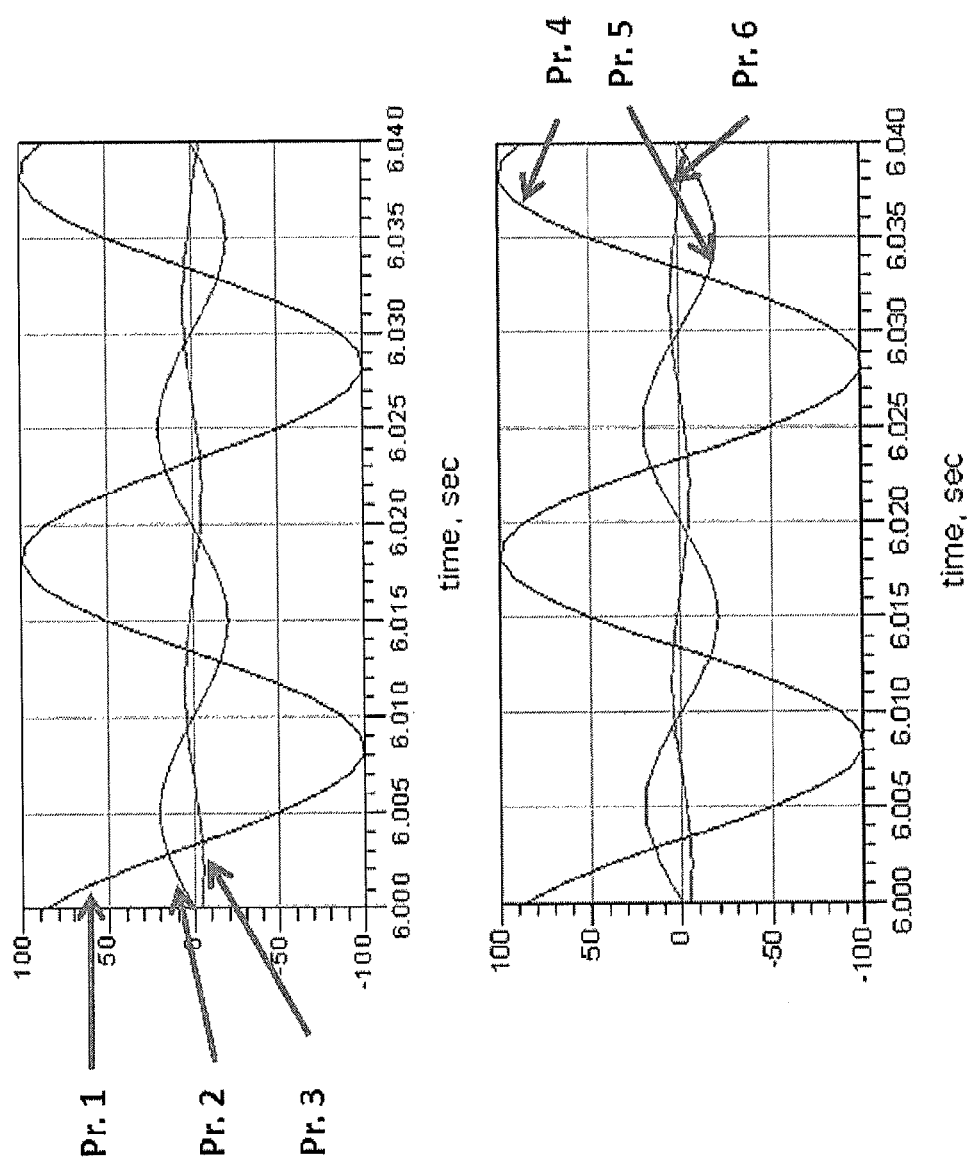
FIG. 14 is a graph showing the simulation results of the B-Line three phase scheme of FIG. 13.
Figure 15:
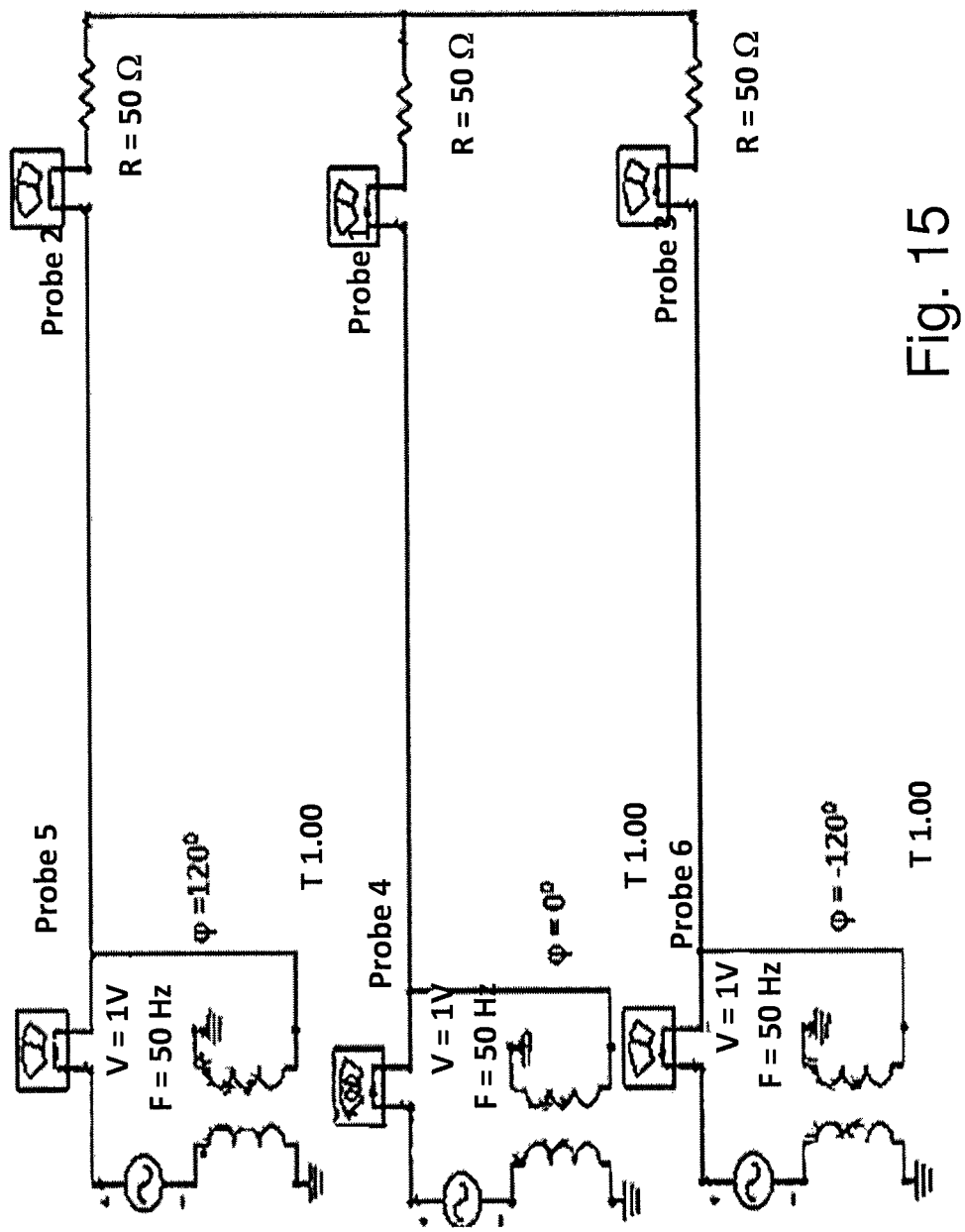
FIG. 15 schematically illustrates an exemplary implementation of B-Line three phase scheme with one pole generators, according to an embodiment of the present invention.

According to some embodiment of the invention, the suggested B-Line concept allows building unbalanced three phase system where currents in all phases do not depend on loads in another phases. FIG. 13 schematically illustrates a B-Line three phase scheme with loads 10, 50 and 200 Ohm. Moreover, this B-Line three phase scheme uses three wires only. The simulation results of this B-Line three phase scheme are shown in FIG. 15). The simulation results on FIG. 14 show that each current depends only on its load, but not like in common three phase system.

Figure 16:
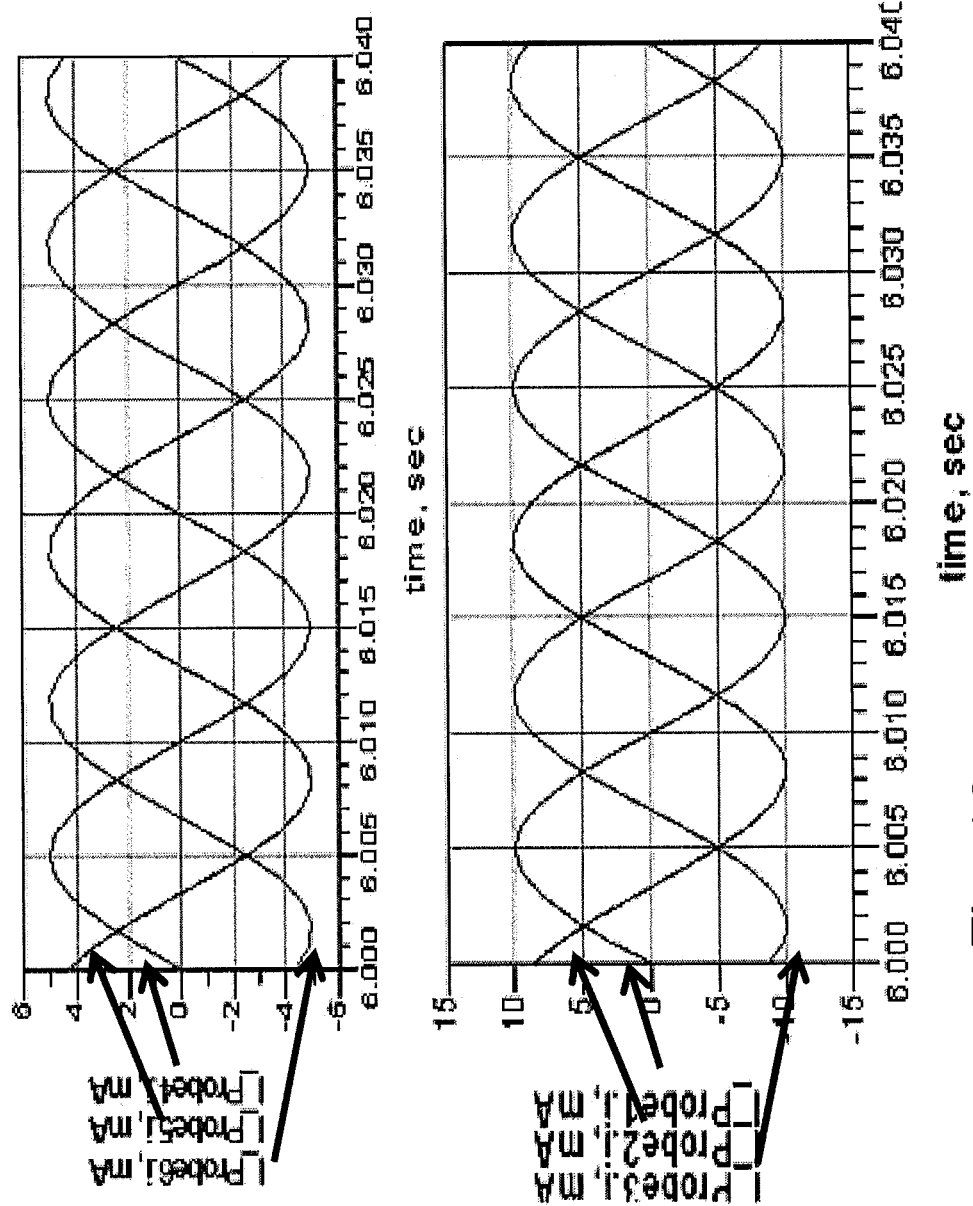
FIG. 16 is a graph showing the simulation results of the B-Line three phase scheme of FIG. 15.
Figure 17A:
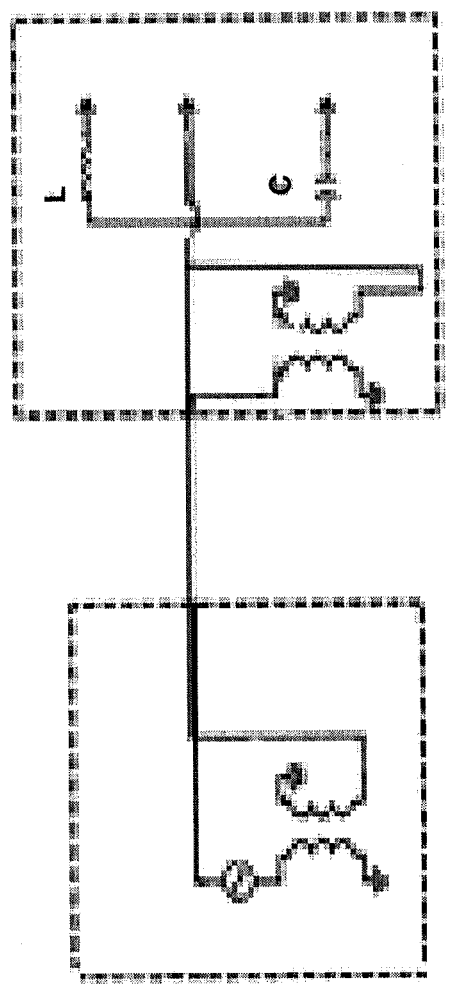
FIGS. 17a and 17b schematically illustrate an exemplary implementation of B-Line three phase scheme with one pole generators and typical three phase load.
Figure 17B:
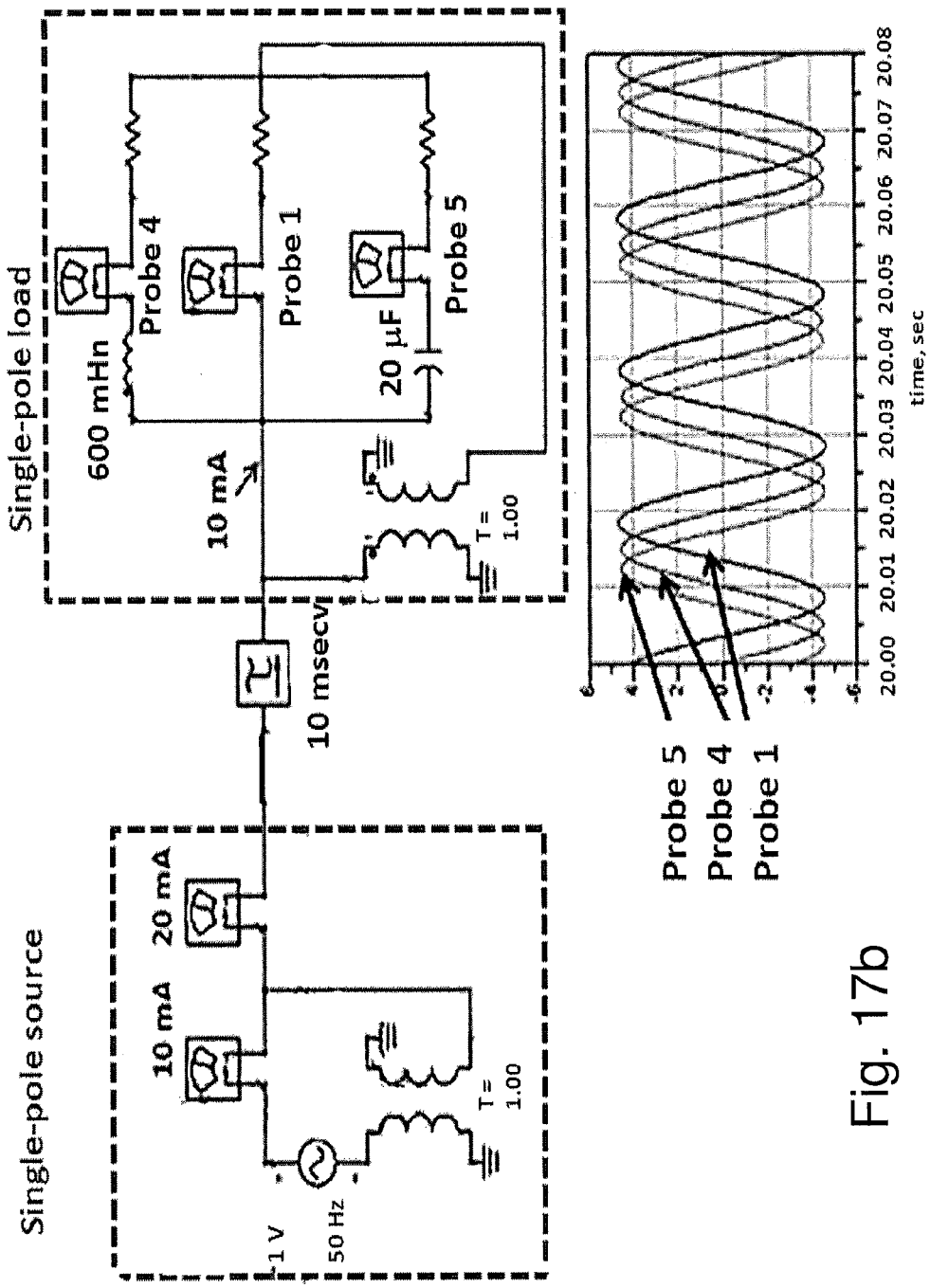

According to another embodiment of the invention, the B-Line three phase system can be built without using of inverters in the receiving parts (as shown with respect to FIG. 15 and to its corresponding simulation results as shown in FIG. 16). Actually this scheme uses one pole generators. As one can see in the graph of FIG. 16, the current values are by two times smaller than currents value in scheme with reflectors in receiving parts. But generators currents are smaller by two times too. Therefore there is no power loses in this scheme too. It is possible to combine one-pole source through one wire with normal three phase load by implementing 1200 phase shifters, as seen in FIGS. 17a-17b.

According to another embodiment, the single-wire may be split into three wires, where each of the three wires is connected to a different pole of a three phase load via a corresponding phase shifting device, in order to form a single-wire three phase system. Accordingly, a first phase shifting device is coupled to one of the poles of the three phase load in such a manner that the first phase shifting device shifts the phase of a first signal propagating through the pole by +60° (e.g., by using a filter). A second phase shifting device is coupled to the second pole of the three phase toad in such a manner that the second phase shifting device shifts the phase of a second signal propagating through the second pole by −60° (e.g., by using a filter). A third phase shifting device is coupled to the third pole of the three phase load in such a manner that the third phase shifting device shifts the phase of a third signal propagating through the third pole by 180° (e.g., by using an inverter). This way, a phase shift of 120° between signals is obtained with minimal energy loss (compared to shifting the phase of the signals by 120° using filters), since the filters are used to shift the phase of the signals only by ±60°.

It should be indicated that if it is desired to protect power lines (cables) there is an option to use a technique where conventional 3 phase high-voltage power lines which extend along a pipe and buried in the ground. However, the high voltage between phases requires substantially separating between them and therefore, the only solution is using 3 insulating pipes (each cable in a separate pipe), to allow sufficient distance between pipes, such that the electric and magnetic field of each line will not induce disturbing currents in the neighboring lines. However, this solution is costly, due to the fact that it is impossible to put all 3 cables in a single pipe. The single-wire electric transmission line system, proposed by the present invention allows using a single high voltage cable (carrying 3 phases) which is extended along a single insulating pipe and buried in the ground, since there are no neighboring lines. This way, the power line is protected against falling trees, rain and falling snow, with relatively low cost, comparing to the need to bury 3 lines.

As will be appreciated by the skilled person the arrangement described in the figures results in an electrical circuit which uses only a single-wire electric transmission line. One-Way system for connection between source and load by one line—(i.e., B-Line) was proposed and checked by simulations and experiments. One way system can be easily implemented as One-pole source, DC B-Line, LF B-Line, HF B-Line, B-Line three phase system, etc.

It is possible to suppose that using one-way method (i.e., B-Line) can considerable decrease the electrical lines cost. Moreover, B-Line method allows decreasing energy loss in high-voltage electric transmission lines. An additional advantage provided by the invention is that it is possible to achieve decreasing of electrical lines radiation, including Corona effect, so far as one of radiation courses in two lines and three phase systems have high voltage between lines. Furthermore, B-Line method allows simplifying the high-frequency long lines and improving their options, including easing the requirements for symmetry, good matching and selective properties. Finally, B-Line method also allows building antennas with one radiated element (monopole) equivalent to two element antenna (dipole).

All the above description and examples have been given for the purpose of illustration and are not intended to limit the invention in any way. Many different mechanisms, methods of analysis, electronic and logical elements can be employed, all without exceeding the scope of the invention.

The invention claimed is:

1. A single-wire electric transmission line system comprising:
    a) a power source having first and second poles; and
    b) a phase shifting device, coupled to one of the poles of said power source so that said phase shifting device shifts the phase of a first signal propagating through said pole and the shifted phase of said first signal will be essentially identical to the phase of a second signal propagating through the other pole, and such that the shifted first signal is added to the second signal with essentially the same phase of second signal, whenever both poles are connected together to form a single-wire, through which the resulting added signal propagates, or:
    c) two phase shifting devices, coupled to each of the poles of said power source in such a manner that each of said phase shifting device shifts the phase of a first signal propagating through said pole and the phase of a second signal propagating through the other pole such that the shifted phases of both signals will be essentially identical, and such that the shifted signals are added with essentially the same phase, when both poles are connected together to form a single-wire, through which the resulting added signal propagates; and
    d) a two polar load, wherein the single-wire is split before the load into two lines, with one of the lines connected to one pole of the load directly to transmit a current to the one pole of the load, while the other of the lines is connected to the load via a phase shifting device which shifts a phase of another current relative to a phase of the one current and transmits the another current with the shifted phase to the load.

2. A single-wire electric transmission line system according to claim 1, in which the phase shifting device(s) is an inverter that shifts the phase of its corresponding pole by +90 degrees, −90 degrees or by 180 degrees, such that the shifted signal(s) is added with essentially the same phase.

3. A system according to claim 1, in which the phase shifting device is a transformer with opposite windings.

4. A system according to claim 1, in which the phase shifting device is a half period delay line with respect to the length of the line that is connected to the other pole of the source.

5. A system according to claim 4, in which the delay line is a one-port strip line including metal wire on dielectric, which delay line lying on the metallic padding.

6. A system according to claim 1, in which the phase shifting device(s) is a digital module adapted for performing a phase shifting.

7. A system according to claim 6, in which the digital module is a Hilbert transform device.

* * * * *